United States Patent [19]

Spada

[11] Patent Number: 5,172,973
[45] Date of Patent: Dec. 22, 1992

[54] AIR COOLED HOUSING FOR LIGHT SOURCE

[76] Inventor: Ronald M. Spada, 524 Osprey Dr., Apt. 9b, Delray Beach, Fla. 33444

[21] Appl. No.: 832,950

[22] Filed: Feb. 10, 1992

[51] Int. Cl.$^5$ ................................................ F21S 3/00
[52] U.S. Cl. ..................................... 362/74; 362/218; 362/294; 362/373
[58] Field of Search ................ 362/74, 218, 264, 294, 362/345, 373

[56] References Cited

U.S. PATENT DOCUMENTS

| | | | |
|---|---|---|---|
| 2,080,120 | 5/1937 | Everett | 362/294 |
| 3,299,884 | 1/1967 | Moore et al. | 128/23 |
| 3,348,036 | 10/1967 | Bodian et al. | 240/41.35 |
| 3,624,380 | 11/1971 | Davis | 362/294 |
| 4,039,817 | 8/1977 | Williams | 362/373 |
| 4,449,166 | 5/1984 | Sharp | 362/149 |
| 4,546,420 | 10/1985 | Wheeler et al. | 362/268 |
| 4,600,979 | 7/1986 | Fisher et al. | 362/373 |
| 4,630,182 | 12/1986 | Moroi et al. | 362/294 |
| 4,734,835 | 3/1988 | Vines et al. | 362/264 |
| 4,858,089 | 8/1989 | Pietro | 362/294 |
| 4,999,758 | 3/1991 | Wimberly | 362/373 |
| 5,021,932 | 6/1991 | Ivey | 362/96 |
| 5,055,988 | 10/1991 | Cartwright | 362/294 |
| 5,093,769 | 3/1992 | Luntsford | 362/294 |

FOREIGN PATENT DOCUMENTS 497239 10/1953 Canada ................... 362/218

Primary Examiner—Carroll B. Dority
Attorney, Agent, or Firm—Oltman and Flynn

[57] ABSTRACT

An apparatus for cooling a light source within a building or vehicle having an air conditioning system includes a housing for surrounding the light source and structure for delivering a stream of cooled air into the housing from the air conditioning system. The structure for delivering a stream of cooled air is preferably a conduit connected to the air conditioning system. The portion of the air conditioning system to which the conduit is connected is preferably an air carrying duct. Where the light source is a light fixture on a ceiling, the housing is essentially frustrum shaped and attached to the ceiling around the light fixture, and has a translucent lens extending over its bottom surface. The housing has an open base and there are three spaced apart lenses at the open base for retaining heated air within the housing, at least one lens being perforated to permit air to enter and exit the housing, the conduits delivering the stream of cooled air between the lenses to absorb and carry away heat. A height adjusting mechanism is preferably provided to adjust the distance between the lens and the open base of the housing. The height adjusting mechanism includes a threaded rod, one end of which is rotatably fit into a threaded bore in the housing and the other end is attached to a knob, such that rotating the knob changes the above-mentioned distance.

8 Claims, 3 Drawing Sheets

AIR COOLED HOUSING FOR LIGHT SOURCE

BACKGROUND OF THE INVENTION

1. Field of the Invention

The present invention relates generally to the field of devices for dispersing heat generated within electric light sources, and more specifically to a housing surrounding a light source which receives a stream of air through conduits from an air conditioning duct to cool the light source, the housing having any suitable shape, preferably that of a frustum, and having three spaced apart lenses at its lower end, the bottom lens being frosted and the conduits being connected at the edges of the lenses to deliver cooled air between the lenses and through perforations in the top lens and into the housing for absorbing and carrying away heat and out through an exhaust vent.

2. Description of the Prior Art

There have long been light sources incorporating means for absorbing or dissipating heat generated by the source. These means have included housings for light sources containing fans, vent ports and insulation, as well as isolated, heat absorbing metal structures.

An example is that of Moore, U.S. Pat. No. 3,299,884, issued on Jan. 24, 1967. Moore teaches an air cooled lamp including a bulb and socket enclosed in an essentially cylindrical housing and attached to an electric cord. The housing also contains a lens, a double-propeller fan and an electric motor for driving the fan, which draws air into the housing through slots and passes it over the bulb and lens. A problem with Moore is that the circulated air is only at room temperature and thus can absorb only a minimal amount of heat. Another problem is that the fan can create an annoying buzz, vibrate the lamp and generate additional heat.

An alternative to the convection heat transfer of Moore is the examination light apparatus of Bodian, U.S. Pat. No. 3,348,036, issued on Oct. 17, 1967. Bodian discloses a metal body surrounding the lens for absorbing heat and then dissipating the heat from fins along its outer surface. A plastic insulating shell surrounds the metal body so that the apparatus can be handled. A problem with Bodian is that, once again, only room temperature air is provided for cooling the light. Another problem is that no means is provided for circulating the air, apart from a minimal natural draft caused by air temperature differences.

Sharp, U.S. Pat. No. 4,449,166, issued on May 15, 1984, recites a rectangular lighting fixture which is inserted as a panel into a drop ceiling. A central housing portion contains light bulbs, while a separate, perimetric portion delivers cooled air from an air conditioning duct into the room. The combined light fixture and air conditioning vent is intended to be both aestheticly pleasing and space saving. A problem with Sharp is that no provision is made for cooling the light source itself.

Wheeler, U.S. Pat. No. 4,546,420, issued on Oct. 8, 1985, teaches a light fixture for transmitting filtered light having a narrowed spectrum. Filter lenses absorb various wavelengths of the light before it leaves the fixture, causing the lenses to become very hot. To dissipate the heat, the lenses are staggered and placed in the path of an air stream from a fan inside the fixture. The air flows between the lenses and cools them. A problem with Wheeler, once again, is that the air circulated is room temperature air, with limited heat absorbing capacity. Also, the overall design of the fixture, for narrowing the spectrum, has few practical uses.

Moroi, U.S. Pat. No. 4,630,182, issued on Dec. 16, 1986, discloses an air-cooled arc lamp which, like Moore and Wheeler above, includes a fan and a cylindrical housing surrounding the lamp and fan. The fan draws air into the housing through side ports, over the reflector, out of a hole in the top of the reflector and blows that air out of the top of the housing. A problem with Moroi, as above, is that room temperature air is used to absorb and carry away heat. And, again, a fan can make an annoying sound and generate heat.

Vines, U.S. Pat. No. 4,734,835, issued on Mar. 29, 1988, teaches a mercury lamp contained in a housing including cooling fins and a vacuum induced air flow to dissipate heat and draw away poisonous vapors in the event the lamp explodes. A problem with Vines is that its usefulness is essentially confined to the peculiarities of the mercury lamp. A vacuum bottle is not suited to generating continuous cooling over a prolonged period of use. The heat fins are helpful but inadequate for proper heat dissipation.

Fisher, U.S. Pat. No. 4,600,979, issued on Jul. 15, 1986, recites a light fixture including a vertical metal cylinder containing the light source. An annular reflector surrounds the cylinder, there being a gap between the two, and an outer housing extends above the reflector. Air near the cylinder absorbs heat from the light source and rises through the gap and into the space between the reflector and the housing. Then the air cools and falls along the upper face of the reflector and escapes through holes at the reflector base. This air may rise to again surround the cylinder and repeat the cycle. A problem with Fisher, once again, is that only room temperature air is supplied. Also, only the minimal natural currents resulting from air temperature differences circulate the air.

Pietro, U.S. Pat. No. 4,858,089, issued on Aug. 15, 1989, is very similar to Fisher in that hot air rises through openings in the reflector and is trapped within an outer housing where it cools. Wimberly, U.S. Pat. No. 4,999,758, issued on Mar. 12, 1991, discloses a plastic housing, spaced apart from the sides of a light bulb for reduced housing temperature. Ivey, U.S. Pat. No. 5,021,932, issued on Jun. 4, 1991, teaches still another ventilator fan in a light source housing. Ivey adds the feature of a thermostat-controlled fan switch. Cartwright, U.S. Pat. No. 5,055,988, issued on Oct. 8, 1991, discloses a surgery lamp within a shroud having ventilating holes and chimneys to carry away heated air. For most of these, room temperature air and minimal air circulation are again problems.

It is thus an object of the present invention to provide a light source cooling apparatus which delivers a continuous stream of air to the light source which is below room temperature and therefore has greater heat absorbing capacity.

It is another object of the present invention to provide such an apparatus which receives the continuous stream of air from an air conditioning duct through two parallel air delivery conduits adjacently joined to a double intake funnel connected to the air conditioning duct and discharging the air stream through an exhaust conduit.

It is still another object of the present invention to provide such an apparatus which can be easily and inexpensively installed in most buildings and vehicles.

It is still another object of the present invention to provide such an apparatus which creates air circulation beyond natural drafts.

It is finally an object of the present invention to provide such an apparatus which is simple in design, reliable and inexpensive to manufacture.

SUMMARY OF THE INVENTION

The present invention accomplishes the above-stated objectives, as well as others, as may be determined by a fair reading and interpretation of the entire specification.

An apparatus is provided for cooling a light source within a structure, including a housing for surrounding the light source, where the light source is a light fixture on a ceiling within the structure and the housing is substantially frustrum shaped and attaches to the ceiling around the light fixture, an air conditioning system including a compressor, an evaporator and a cooling fluid, a conduit for delivering a stream of cooled air into the housing from a portion of the air conditioning system, where the housing has an open base and there are three spaced apart lenses at the open base for retaining heated air within the housing, at least one lens being perforated to permit air to enter and exit the housing, the conduit delivering the stream of cooled air between the lenses to absorb and carry away heat. An apparatus is also provided for cooling a light source within a structure, including a housing having an open base for surrounding the light source, where the light source is a light fixture on a ceiling within the structure and the housing is substantially frustrum shaped and attaches to the ceiling around the light fixture, and has a translucent lens extending over the open base, an air conditioning system including a compressor, an evaporator, a cooling fluid, and an air delivery vent, structure for delivering a stream of cooled air into the housing from the air delivery vent, and a distance adjusting assembly to adjust the distance between the lens and the open base of the housing. The distance adjusting assembly preferably includes a threaded rod, one end of which is rotatably fit into a threaded bore in the housing and the other end is attached to a knob, so that rotating the knob changes the distance. The conduit preferably has a flexible segment for permitting movement of the light source relative to the air conditioning system. The portion of the air conditioning system to which the conduit is connected is preferably an air carrying duct. The apparatus will additionally include an exhaust conduit for carrying air out of the housing and away from the light source. The structure is optionally a building or a vehicle.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
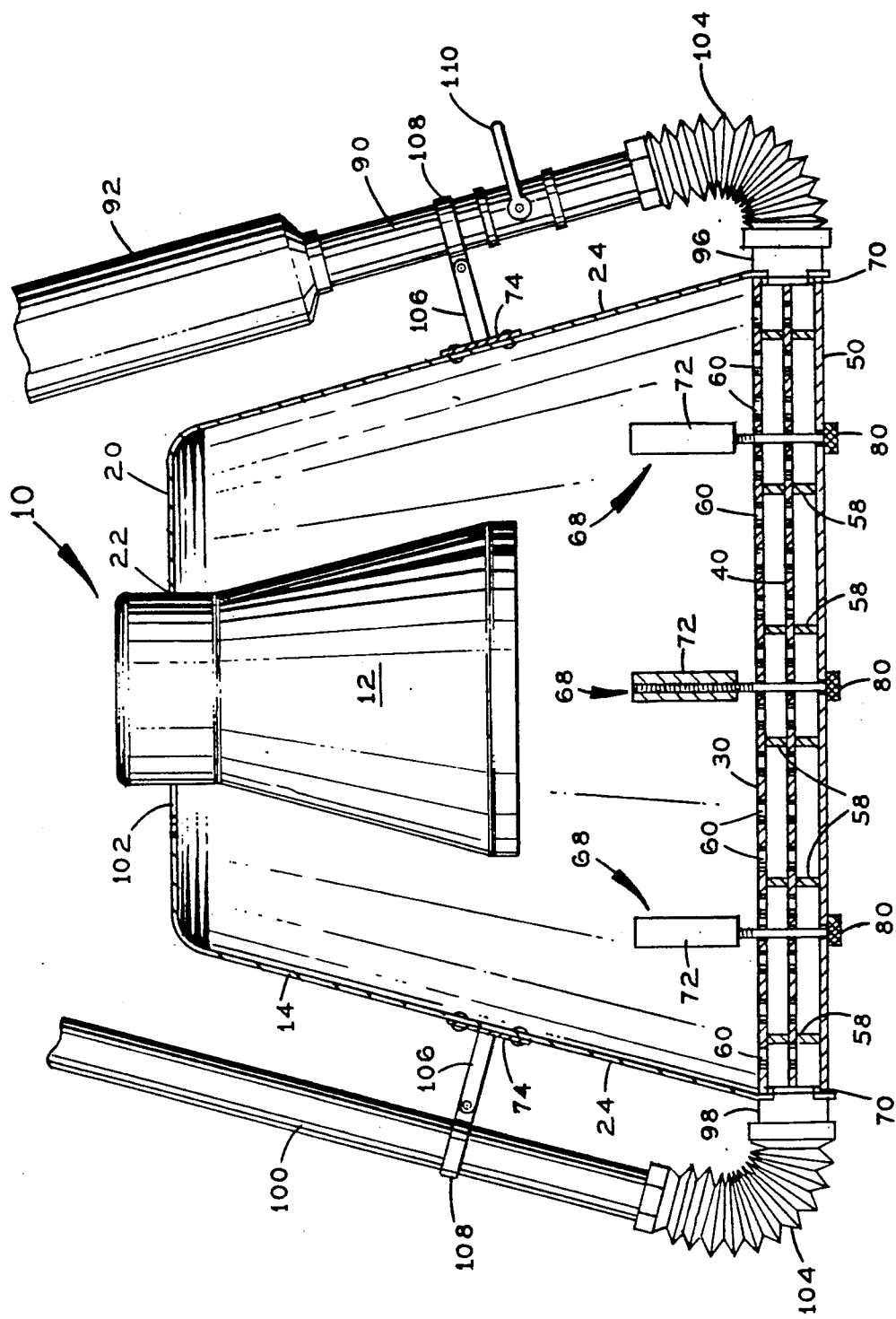
FIG. 1 is a cross-sectional side view of the first embodiment of the inventive cooling apparatus, showing the triple lens and alternative exhaust conduit and exhaust opening features. A portion of an optional shroud is shown on the an air delivery conduit.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

FIRST PREFERRED EMBODIMENT

Referring to FIG. 1, an apparatus 10 for dispersing and dissipating heat generated within an electric light fixture 12 in a building equipped with air conditioning is disclosed. Apparatus 10 includes a housing 14 for containing the light fixture 12 and means for delivering a stream of air into housing 14 from an existing air conditioning duct to cool light fixture 12.

Housing 14 is preferably frustum-shaped with a circular top wall 20 having a central opening 22 for receiving the base of light fixture 12. Housing 14 also includes circular a side wall 24 connected to the edge of top wall 20 and extending and expanding downward. Many other housing 14 shapes are contemplated and it is noted that virtually any three-dimensional shape would be suitable.

Figure 2:
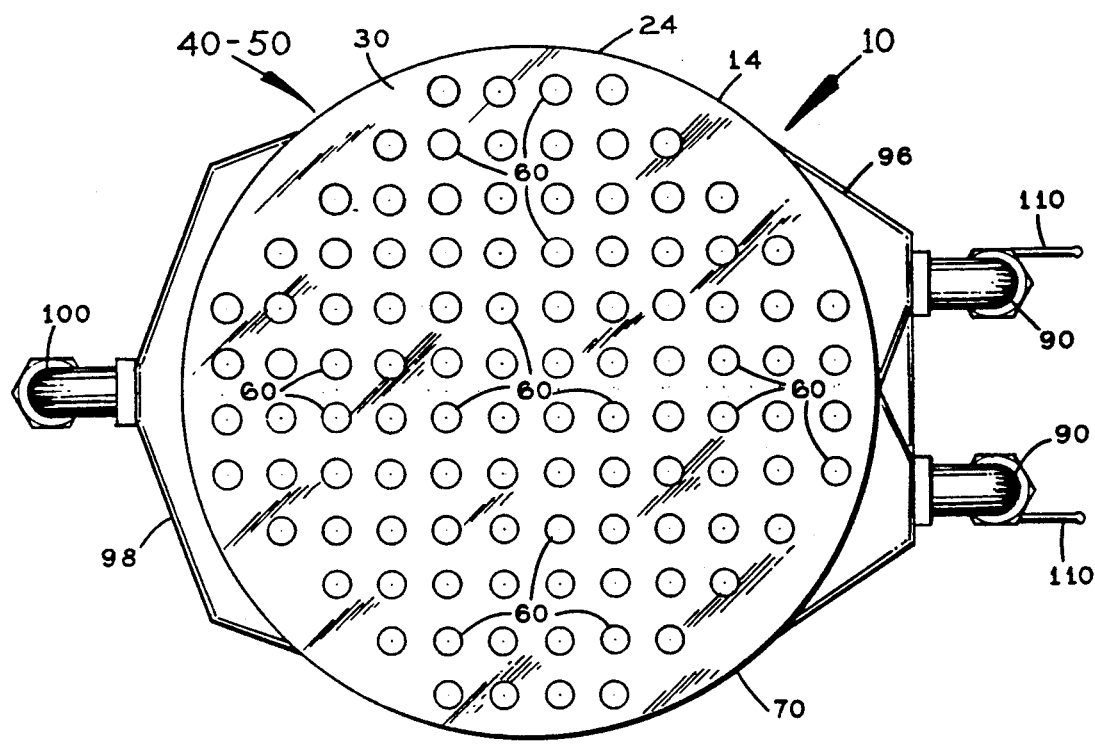
FIG. 2 is a bottom view of the apparatus showing the perforations in the top lens, as seen through the transparent middle and bottom lenses, and the double delivery conduit feature.

An upper lens 30, a middle lens 40 and a lower lens 50, each preferably made of a transparent plastic such as LUCITE TM and spaced apart from each other by spacers 58, extend across the bottom of housing 14. See FIG. 2. Upper lens 30 has a plurality of air admitting ports 60 and lower lens 50 is preferably frosted for improved apparatus 10 appearance. Lenses 30, 40 and 50 are joined to housing 14 by adjustable screw means 68 and are surrounded by a cylindrical wall 70 attached to their edges. A polyurethane O-ring seal extends between the lower edge of housing 14 and upper lens 30. A cylindrical wall 70 surrounds and attaches to the edges of lenses 30, 40 and 50.

Adjustable screw means 68 includes threaded tubes 72 welded to the inner face 74 of side wall 24 parallel to the frustum axis of housing 14. One end of a threaded rod 76 screws into each tube 72 and the other end screws into a knob 80. Threaded rods 76 each fit through holes 82 in lenses 30, 40 and 50, lens 50 being supported by knobs 80. In this way, rotating knobs 80 one way moves lenses 30, 40 and 50 toward housing 14 and rotating knobs 80 the other way moves them away from housing 14. Lenses 30, 40 and 50 can be removed from housing 14 by completely unscrewing rods 76 from tubes 72.

Figure 3:
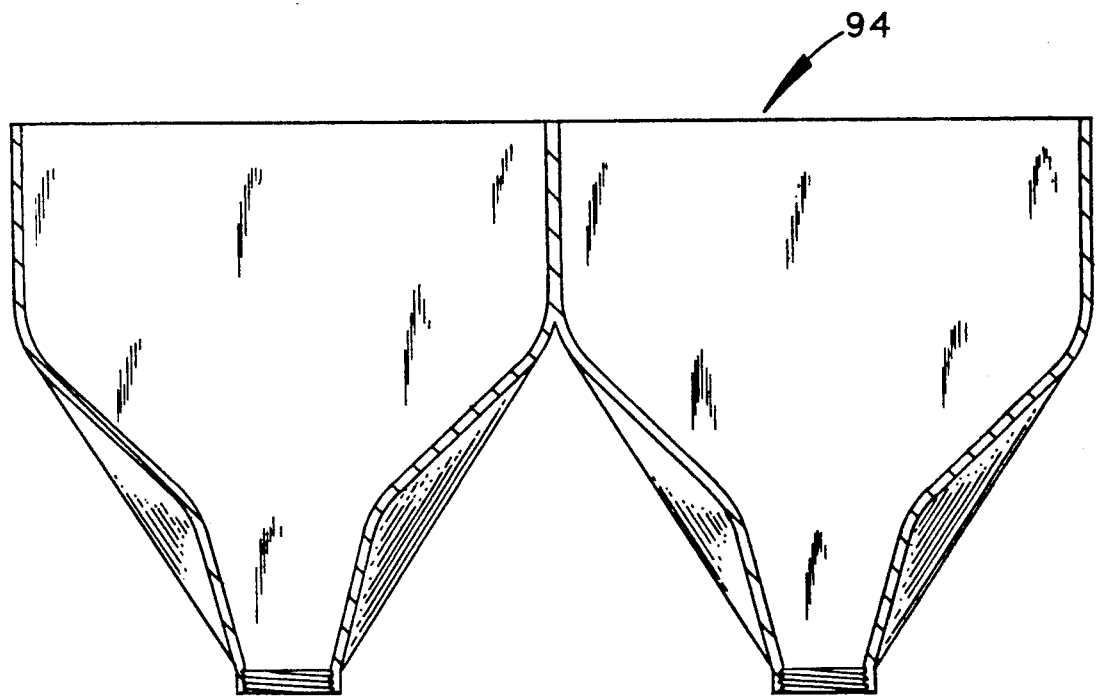
FIG. 3 is a cross-sectional side view of the double air gathering funnel portion of an air delivery conduit.
Figure 5:
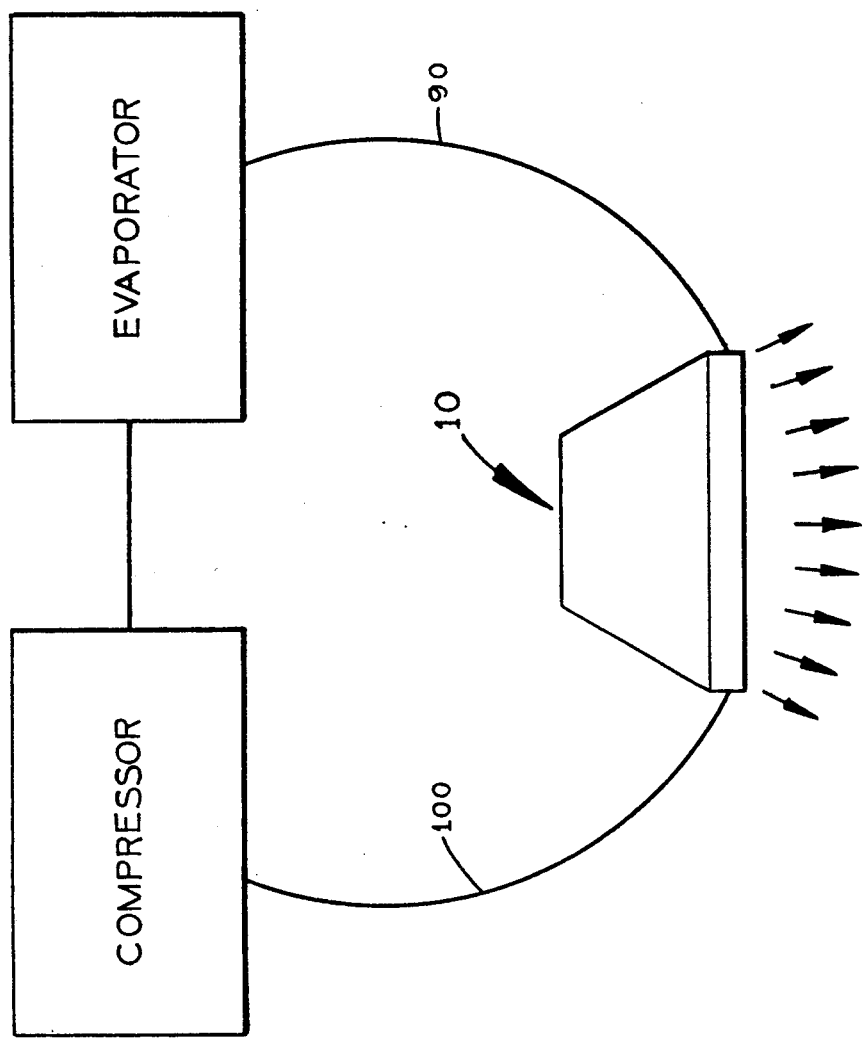
FIG. 5 is a schematic illustration of the inventive cooling apparatus and air conditioning system.
Figure 4:
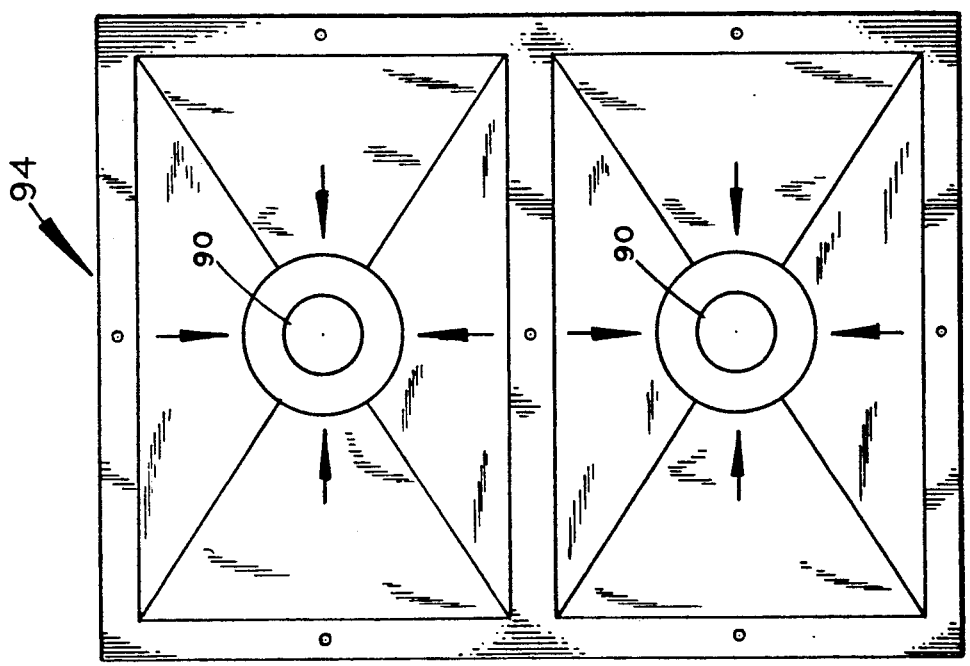
FIG. 4 is a top view of the double air gathering funnel portion of FIG. 3.

An air delivery conduit 90 for delivering cooled air between lenses 30, 40 and 50 connects at one end to an air conditioning duct in the ceiling. Conduit 90 expands as it meets the duct to form an air gathering funnel. It is preferred that two parallel air delivery conduits 90 be provided and that their air gathering funnels be joined together to form a single double funnel 94. See FIGS. 3 and 4. The other end of conduit 90 connects to cylindrical wall 70 between lens 30 and lens 50, and is wide enough to extend beyond both faces of lens 40. This other end of conduit 90 preferably expands around a wide portion of the circumference of cylindrical wall 70 to create a dispersing funnel. Where two conduits 90 are provided, their dispersing funnels preferably join to form a double dispersal funnel 96. A stream of cooled air is carried through conduit 90 and into the spaces between lenses 30, 40 and 50. This air stream passes over the faces of the lenses, through ports 60, into housing 14 and over light fixture 12. It is preferred that two air delivery conduits 90 be provided.

An air exhaust conduit 100 also connects to cylindrical wall 70 between lens 30 and lens 50 and is wide enough to extend beyond both faces of lens 40. Air exhaust conduit 100 preferably carries air out through the ceiling of the building. Exhaust conduit 100 gathers air from between lenses 30, 40 and 50 through a funnel portion 98. Alternatively, an exhaust opening 102 is provided in top wall 20 to permit rising hot air to escape. Conduits 90 and 100 each preferably have a flexible segment 104 located just above light fixture 12 and another at air gathering funnels 94 to permit tilting of light fixture 12. Flexible segments 104 are polyplastic flexible elbows having O-rings at either end. A shroud 92 is optionally provided around conduits 90 and 100 individually, or around conduits 90 and 100 and housing 14 together, to improve the appearance of apparatus 10.

Brackets 106 attach conduits 90 and 100 to side wall 24 for support. One end of each bracket 106 is screwed to side wall 24 and the other end is attached to an adjustable hose clamp 108 for engaging conduits 90 and 100. Brackets 106 and hose clamps 108 are preferably made of stainless steel so that they remain durable and free of corrosion. A valve 110 is preferably provided in each air delivery conduit 90 to regulate the flow of air into housing 14.

It is contemplated that apparatus 10 may be installed in structures other than buildings, such as vehicles equipped with air conditioning systems. It is also contemplated that a form of apparatus 10 may be used on light sources other than electric lights, such as gas lights.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An apparatus for cooling a light source within a structure, comprising:
    a housing for surrounding said light source, wherein said light source is a light fixture on a ceiling within said structure and said housing attaches to said ceiling around said light fixture,
    an air conditioning system comprising a compressor, an evaporator and a cooling fluid,
    conduit means for delivering a stream of cooled air into said housing from a portion of said air conditioning system,
    wherein said housing has an open base and there are three spaced apart lenses at said open base for retaining heated air within said housing, at least one said lens being perforated to permit air to enter and exit said housing, said conduit means delivering said stream of cooled air between said lenses to absorb and carry away heat.

2. An apparatus for cooling a light source within a structure, comprising:
    a housing having an open base for surrounding said light source, wherein said light source is a light fixture on a ceiling within said structure and said housing attaches to said ceiling around said light fixture, and has a translucent lens extending over said open base,
    an air conditioning system comprising a compressor, an evaporator, a cooling fluid, and an air delivery vent,
    means for delivering a stream of cooled air into said housing from said air delivery vent,
    distance adjusting means to adjust the distance between said lens and said open base of said housing.

3. An apparatus according to claim 2,
    wherein said distance adjusting means comprises a threaded rod, one end of which is rotatably fit into a threaded bore in said housing and said other end is attached to a knob, such that rotating said knob changes said distance.

4. An apparatus according to claim 1, wherein said conduit means has a flexible segment for permitting movement of said light source relative to said air conditioning system.

5. An apparatus according to claim 1, wherein said portion of said air conditioning system to which said conduit means is connected is an air carrying duct.

6. An apparatus according to claim 1, additionally comprising exhaust conduit means for carrying air out of said housing and away from said light source.

7. An apparatus according to claim 1, wherein said structure is a building.

8. An apparatus according to claim 1, wherein said structure is a vehicle.

* * * * *